United States Patent [19]

Dobson et al.

[11] Patent Number: 5,093,528
[45] Date of Patent: Mar. 3, 1992

[54] PROCESS FOR THE PRODUCTION OF SECONDARY AMINE TERMINATED POLYETHERS AND THEIR USE

[75] Inventors: Ian D. Dobson, Cottingham; Simon F. T. Froom, Snaith, both of England

[73] Assignee: BP Chemicals Limited, London, England

[21] Appl. No.: 567,062

[22] Filed: Aug. 14, 1990

[30] Foreign Application Priority Data

Aug. 19, 1989 [GB] United Kingdom ............ 8918965

[51] Int. Cl.$^5$ .................................... C07C 209/26
[52] U.S. Cl. ........................ 564/472; 564/398; 564/480; 564/63; 564/64
[58] Field of Search ............... 564/472, 398, 480, 63, 564/64

[56] References Cited

U.S. PATENT DOCUMENTS

| | | | |
|---|---|---|---|
| 4,123,462 | 10/1978 | Best | 260/585 B |
| 4,138,437 | 2/1979 | Strauss et al. | 260/583 R |
| 4,286,074 | 8/1981 | Davis et al. | 521/137 |
| 4,396,729 | 8/1983 | Dominquez et al. | 521/51 |
| 4,491,538 | 1/1985 | McCoy | 252/541 |
| 4,625,063 | 11/1986 | Yokota et al. | 564/480 |
| 4,789,691 | 12/1988 | Matzke et al. | 521/159 |
| 4,792,622 | 12/1988 | Yokota et al. | 564/398 |
| 4,904,751 | 2/1990 | Speranza et al. | 528/45 |
| 4,927,912 | 3/1990 | Speranza et al. | 528/405 |

FOREIGN PATENT DOCUMENTS

| | | |
|---|---|---|
| 2545695 | 4/1977 | European Pat. Off. . |
| 0146508 | 6/1985 | European Pat. Off. . |
| 0163253 | 12/1985 | European Pat. Off. . |
| 0284398 | 9/1988 | European Pat. Off. . |
| 0284912 | 10/1988 | European Pat. Off. . |
| 0322089 | 6/1989 | European Pat. Off. . |
| 0343486 | 11/1989 | European Pat. Off. . |
| 356047 | 2/1990 | European Pat. Off. . |
| 1575141 | 7/1969 | France . |
| 1219024 | 1/1971 | United Kingdom . |

OTHER PUBLICATIONS

Abstract E. P. 312253.
Abstract U.S. Pat. No. 4,772,750.
Abstract Japan 62149647.
Abstract U.S. Pat. No. 4,152,353.
J. March, Advanced Chemistry Reactions, Mechanism & Structure, 2nd Ed., McGraw Hill, 1985, 796-800 pp.

*Primary Examiner*—Glennon H. Hollrah
*Assistant Examiner*—S. Kumar
*Attorney, Agent, or Firm*—Nixon & Vanderhye

[57] ABSTRACT

Process for producing a secondary amine terminated polyether from a primary amine terminated polyether in which the primary amine terminated polyether is reacted at elevated temperature with a carbonyl compound in the presence of hydrogen and a catalyst composition comprising nickel, ruthenium and at least one other transition metal selected from the second or third row transition metals. The amount of carbonyl compound employed is in excess of the stoichiometric amount required to react completely with the ether. The secondary amine terminated polyethers are useful in the formation of polyurea elastomers.

9 Claims, No Drawings

PROCESS FOR THE PRODUCTION OF SECONDARY AMINE TERMINATED POLYETHERS AND THEIR USE

The present invention relates to a process for the production of a secondary amine terminated polyether and the use of amines so-produced in the formation of polyurea elastomers.

Both primary and secondary amine terminated polyethers are useful in the manufacture of polyurethanes by reaction with isocyanates. The generally rapid cure rate of primary amine terminated polyethers is valuable in many applications but for certain applications the relatively slower cure rate of the secondary amine terminated polyethers is desirable. The contamination of the secondary amine terminated polyethers with as little as 5 to 10% by weight of the primary amine terminated polyether can be sufficient to increase the cure rate beyond that which is desirable for certain applications. Difficulties have been experienced in producing the secondary amine terminated polyethers substantially free from primary and tertiary amine terminated polyethers. The latter materials do not react with isocyanates and therefore act as inert diluents in the secondary amine terminated polyethers. They can, however, catalyse the reaction of unconverted hydroxyl terminated polyether with isocyanates and hence variance in the level of tertiary amine groups could cause reactivity changes, especially with partially converted material.

In our experience the production of secondary amine terminated polyethers in high selectivities by the high pressure reductive amination of polyether polyols with alkyl amines is not feasible because there is a significant degree of self condensation of the aliphatic amine. This liberates ammonia which can itself react with the polyol giving a mixed product. This problem is to some extent overcome in our European patent application number 89307925.1 (BP Case 6993) which was published after the priority date of the present application as European patent application publication number 0356046 and which describes systems operating at atmospheric pressure with recirculation and separation of volatile components to give secondary amine terminated polyethers at selectivities apparently greater than 90%. However, the atmospheric pressure process, although offering improved selectivity over high pressure processes, suffers from high gas circulation rates and low productivity. Moreover secondary alkylamines can be formed and, although these are removeable in the separation stage, they represent a potentially significant problem both environmentally and economically.

We have now found that secondary amine terminated polyethers can be selectively produced from a primary amine terminated polyether by reaction with a stoichiometric excess of a carbonyl compound and hydrogenation. Although reaction of a simple low molecular weight hydroxyl-containing compound with a carbonyl compound to form an imine, followed by hydrogenation of the imine to form a secondary amine is known, it is in our view surprising that the reaction can be extended to high molecular weight materials, the more so because J. March in Advanced Organic Chemistry: Reactions, Mechanisms and Structure, 2nd Ed., McGraw-Hill, 1977, at page 820, would appear to teach that high selectivities to the secondary amine can only be achieved using an excess of the primary amine. This is contrary to our experience using high molecular weight materials, in which an excess of the carbonyl compound is necessary to produce the secondary amine terminated material at high selectivity.

European patent application publication number EP 0352568, published after the priority date of the present application, describes a process for the preparation of secondary polyether amines in which 1 to 30 mol. of a carbonyl compound of the general formula:

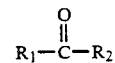

in which $R_1$ is hydrogen, straight-chain, branched or cyclic alkyl of 1 to 6 carbon atoms, $R_2$ is branched alkyl of 3 to 10 carbon atoms, 2-furyl or 2-tetrahydrofuryl, $R_1$ and $R_2$ together are cyclic alkyl or 5 to 8 carbon atoms, unsubstituted or mono-, di or tri-substituted by alkyl of 1 to 3 carbon atoms, are reacted with 1 molar equivalent of a polyoxy-alkylenedi- or triamines of the general formula:

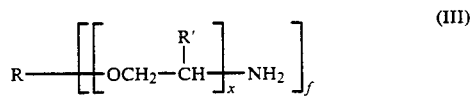

in which
R is

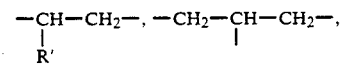

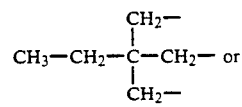

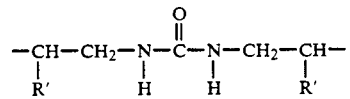

R' is hydrogen or methyl,
x is 1–100 and
f is 2 or 3,
at a temperature in the range from 55° to 160° C. until the H$_2$O formation is completed, and in which the reaction product is hydrogenated under pressure in the presence of noble metal catalysts.

In EP 0352568 the examples describe a two-step process in which the carbonyl compound and the polyoxyalkylene di or triamines are reacted together at atmospheric pressure with removal of water and the intermediate product is hydrogenated at pressure. EP 0352568 does not contemplate the reaction between the carbonyl compound and the hydrogenation taking place together in the same reaction vessel.

Our European patent application publication number 0284398A describes a process for the production of amines by reacting at elevated temperature a first reactant which is either an alcohol, an aldehyde or a ketone with a second reactant which is either ammonia, a primary or secondary amine or a nitrile in the presence as catalyst of a composition comprising (i) nickel, (ii) ruthenium, and (iii) at least one other transition metal selected from either the second or third row transition metals.

The examples given in EP 0284398 only relate to reactions of alcohols with ammonia and propylamine.

European patent publication number EP 0322089A describes a polyurethane coating composition which may be heat cured under relatively mild conditions and which comprises a blocked isocyanate and a curing agent comprising an N,N'-dialkyl substituted polyoxyalkylene amine. The N,N'-dialkyl substituted polyoxyalkylene amine is made by the reaction of a polyoxyalkylene amine, acetone and/or methyl ethyl ketone and hydrogen in the presence of a hydrogenation catalyst. Useful hydrogenation catalysts are said to include the nickel, copper, chromium catalyst as described in U.S. Pat. No. 3,654,370 to Yeakey. Raney nickel and Raney nickel promoted with molybdenum are also said to be useful hydrogenation catalysts.

In the examples given in EP 0322089 the reaction products contain significant quantities of primary amine contents.

It has been surprisingly found that residual primary amine contents can be reduced by the use of a reductive amination catalyst composition comprising (i) nickel, (ii) ruthenium and (iii) at least one other transition metal selected from either the second or third row transition metals.

Accordingly, the present invention provides a process for the production of a secondary amine terminated polyether from a primary amine terminated polyether which process comprises reacting the primary amine terminated polyether at elevated temperature with a carbonyl compound in the presence of hydrogen and in the presence of a catalyst composition comprising (i) nickel, (ii) ruthenium and (iii) at least one other transition metal selected from either the second or third row transition metals, the amount of carbonyl compound being in excess of the stoichiometric amount required to react completely with the ether.

As regards the catalyst composition, any transition metal other than ruthenium may be used as component (iii). In the context of this specification the term 'transition metal' is defined as a metal having a partially filled 4d or 5d shell in at least one of its oxidation states. Suitable transition metals include palladium, rhenium and iridium, either individually or in combination.

Preferably, the catalyst composition is supported on a suitable support. Suitable supports include aluminas, silicas, silica-aluminas and carbons. A preferred support is gamma-alumina. Zeolites may also be used as supports.

As regards the relative proportions of components (i), (ii) and (ii) in the catalyst composition, the major component will generally be component (i), i.e. nickel, and components (ii), i.e. ruthenium, and (iii) i.e. transition metal(s) will be minor components. Thus, nickel may suitably form from 50 to 95% by weight of the catalyst composition and together ruthenium and transition metal may form the remainder of the composition. Typically the supported catalyst composition may contain about 10% nickel and 1% each of ruthenium and transition metal(s), the remainder of the composition being the support. However, higher nickel loadings may be used if desired.

The catalyst composition may be prepared by any of the methods conventionally employed for the production of catalysts, for example by precipitation or by impregnation. The supported composition is suitably prepared by an impregnation technique, which may be by co-impregnation or by sequential impregnation, preferably the latter. Impregnation techniques are well known in the art and include both the incipient wetness technique and the excess solution technique.

For further details of this catalyst reference is made to our European patent application publication number 0284398A (BP Case No. 6586) which is hereby incorporated by reference.

It is also preferred to perform the process in the presence of a solvent for the reactants. Suitable solvents include liquid hydrocarbons, for example paraffins. An example of a suitable solvent is hexane.

The starting material for the process is a primary amine terminated polyether, which may suitably be derived in known manner from a polyether polyol. Thus, the polyether polyol may be reacted at elevated temperature with ammonia in the presence of a catalyst for the reaction. Processes for producing primary amine terminated polyethers from polyether polyols are described in our European patent application publication number 0284398A (BP Case No. 6586) and our European patent application publication number 0356046A (BP Case No. 6993) both of which are hereby incorporated by reference. Either of these processes may be employed.

The primary amine terminated polyether may be based upon ethylene oxide or propylene oxide and may have a molecular weight from about 148 to about 5000.

As the carbonyl compound there may suitably be used a compound having the formula (I)

wherein independently R and R¹ may be hydrogen, hydrocarbyl or substituted hydrocarbyl. Suitable hydrocarbyl groups include alkyl, suitably $C_1$ to $C_4$ alkyl, aryl and alkaryl groups. A preferred hydrocarbyl group is a $C_1$ to $C_4$ alkyl group, most preferably a straight-chain alkyl group, though the preference for any particular $C_1$ to $C_4$ alkyl group will depend on the application and formulation used. The hydrocarbyl group may also be substituted by a variety of functional groups, including amino and hydroxyl groups. A suitable carbonyl compound is acetone. The amount of carbonyl compound added must be in excess of the stoichiometric amount required to react completely with the polyether to form the corresponding imine according to the reaction:

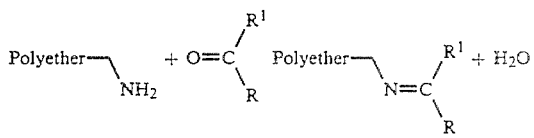

Hydrogenation of the imine provides the secondary amine terminated polyether.

Hydrogen of commercial purity may be used, with or without further purification. The hydrogen partial pressure may suitably be in the range from 1 to 150 bar, preferably from 1 to about 52 bar (750 psi). The total pressure may suitably be the autogenous pressure generated in a closed reaction vessel.

The elevated temperature employed in the reaction of the primary amine terminated polyether with the carbonyl compound may suitably be in the range from 50° to 350° C., preferably from 100° to 160° C. The optimum reaction temperature is selected such that the incorporation of hydroxyl functionality into the product is compatible with the particular application, higher temperatures leading to greater hydroxyl functionality in the product.

The process may be operated batchwise or continuously. Generally, it will be necessary to separate the catalyst from the liquid product of the reaction. This may suitably be accomplished by filtration or centrifugation or by the use of a fixed bed catalyst.

In another aspect the present invention provides a process for the production of a polyurea by reacting an amine with an isocyanate wherein the amine is a secondary amine terminated polyether produced by the process as hereinbefore described.

In another aspect the present invention provides a process for the production of an isocyanate terminated prepolymer by reacting an amine with a molar excess of isocyanate functional groups and the production of a polyurea therefrom by reaction with water wherein the amine is a secondary amine terminated polyether produced by the process as hereinbefore described.

In a further aspect the present invention provides a process for the production of an epoxy coating by reacting an amine with an epoxide wherein the amine is a secondary amine terminated polyether produced by the process as hereinbefore described.

The invention will now be further illustrated by reference to the following Examples.

In the Examples there is used a Ni/Re/Ru/Alumina catalyst. This was prepared in the manner described in our European patent application publication number 0284398 (BP Case No. 6586) under the heading 'CATALYST PREPARATION'. The catalyst composition contained 10% Ni, 1% Re and 1% Ru by weight based on the weight of the composition.

EXAMPLE 1

Jeffamine EDR-148 (an ethylene oxide based polyether primary amine of formula (II); ex Texaco; 5 g) was mixed with hexane (5 ml) as solvent and Ni/Re/Ru/Alumina catalyst (0.5 g). The mixture was placed in a 70 ml magnetically stirred stainless steel reactor, to which was then added acetone 7.2 ml, (1.5 stoichiometric equivalents).

The reactor was connected to a gas manifold and was pressurised to 750 psi with hydrogen. The reactor was sealed, then heated to 150° C. for 2.5 hours and then cooled and depressurised. The recovered product was filtered and volatile material was removed by evaporation under reduced pressure.

The product was identified by $^1$H and $^{13}$C n.m.r. spectroscopy as being the secondary amine terminated polyether of formula (III). A yield of at least 84% of the theoretical amount was recovered and no NMR spectroscopic evidence could be seen for the presence of residual primary amine groups (implying less than 5% primary amine present).

   (II)

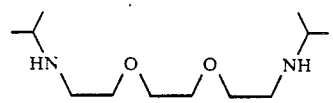

This Example demonstrates the high yield and productivity achieved using an ethylene oxide based polyether primary amine.

Example 2

Jeffamine T-5000 (a high molecular weight propylene oxide based polyether primary amine ex Texaco; 10 g) was mixed with hexane (5 ml) solvent and Ni/Re/Ru/Alumina catalyst (0.1 g). The mixture was placed in a 70 ml magnetically stirred stainless steel reactor, to which was added 7 g (20 stoichiometric equivalents) of acetone.

The reactor was connected to a gas manifold and was pressurised to 750 psi with hydrogen. The reactor was sealed, then heated to 175° C. for 13 hours and then cooled and depressurised. The recovered product was filtered and volatile material was removed by evaporation under reduced pressure.

The product was identified by $^1$H and $^{13}$C n.m.r. spectroscopy as being fully converted to the secondary amined terminated polyether of formula (IV).

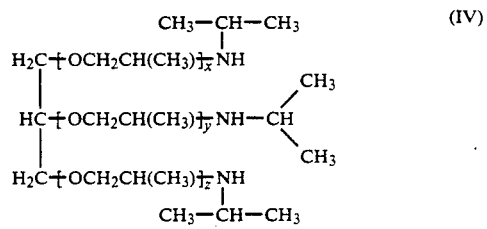

This Example demonstrates the high yield and productivity achieved using a high molecular weight propylene oxide based polyether primary amine.

PREPARATION OF PRIMARY AMINE TERMINATED POLYETHER

This is not an example according to the present invention because it does not involve the reaction of a carbonyl compound and a primary amine terminated polyether. It is included to demonstrate the high selectivity and productivity achievable in the preparation of a primary amine terminated polyether from a polyether polyol.

Polyether polyol (designated CP-1 ex BP Chemicals; 10 g) of formula (V) was mixed with the Ni/Re/Ru/Alumina catalyst (2 g). The mixture was placed in a 70 ml magnetically stirred stainless steel reactor. This was cooled to −78° C. and to it was then added liquid ammonia (10 ml).

The reactor was connected to a gas manifold and was pressurised to 500 psi with hydrogen. The reactor was heated to 220° C. for 12 hours and then was cooled and depressurised. The recovered product was filtered and volatile material was removed by evaporation under reduced pressure.

The product was identified by $^{13}$C n.m.r. spectroscopy as being wholly primary amine terminated polyether.

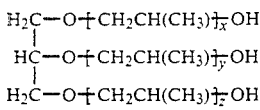

COMPARISON TEST 1

This is not an example according to the present invention because it does not involve the reaction of a primary amine terminated polyether with a carbonyl compound. It is included for the purpose of demonstrating that poor selectivity is achieved in a model reaction in which ethanolamine was used as the amine rather than a polyether polyamine.

Ethanolamine (5 g) was mixed with hexane (5 ml) solvent and the Ni/Re/Ru/Alumina catalyst (0.5 g). The mixture was placed in a 70 ml magnetically stirred stainless steel reactor and to it was then added acetone (2 equivalents).

The reactor was connected to a gas manifold and was pressurised to 1000 psi with hydrogen. The reactor was heated to 120° C. for 12 hours and was then cooled and depressurised. The recovered product was filtered and volatile material was removed by evaporation under reduced pressure.

The resulting product liquid was then analysed by gas liquid chromatography. The conversion of ethanolamine observed was 91.5% with only 58% selectivity to the major product. A further five components had a combined selectivity of 26% whilst over thirty minor components accounted for the remainder of the product. Details of the GLC method were as follows:

Column: 50 m capillary (5% methyl phenyl silicone)
Injector temperature: 180° C.
Detector: flame ionisation detector at 250° C.
Initial condition: 40° C. for 6 minutes
Temperature ramp: 10° C./min to 250° C.
Final condition: 250° C. for 30 minutes.

COMPARISON TEST 2

This is not an example according to the invention because it does not involve the reaction of a primary amine terminated polyether with a carbonyl compound. It is included for the purpose of demonstrating that the conventional high pressure route to the secondary amine terminated polyether by reductive amination of a polyether polyol with an alkyl amine is unselective by comparison with the process of the invention.

4 Kg of polyether polyol CP-1 and 400 g of raney nickel were charged into a 7 dm³ stainless steel autoclave. 200 ml of propylamine was then added and the autoclave was connected to a gas manifold. 240 psig of hydrogen was then pumped into the autoclave which was heated to 220° C. for 16 hours. The product recovered showed by $^{13}$CNMR analysis a conversion of about 20% with 50% selectivity to the propylaminated end group and 50% selectivity to the undesired NH$_2$ end group. Dipropylamine and tripropylamine were observed to be reaction products.

REACTION OF SECONDARY AMINE TERMINATED POLYETHERS WITH AN ISOCYANATE

This example shows that secondary amine terminated polyethers react more slowly than primary amine terminated polyethers with 4,4'-phenylmethane diisocyanate (MDI).

Three amine terminated polyethers (ATP's) were used in this experiment; Jeffamine D2000 (a high molecular weight primary amine terminated polyether available from Texaco); an isopropyl capped secondary ATP prepared according to the present invention from Jeffamine D2000 and a 2-(4-methyl pentyl) capped secondary ATP prepared from Jeffamine D2000 by a two step process.

The ATPs (0.8% w/w in dichloromethane, 2 ml) were reacted separately with MDI (0.1% w/w in dichloromethane, 2 ml) in a stop flow apparatus at room temperature and the reactions were monitored by a FT-IR spectrometer. A spectrum was recorded every 4.5 seconds and the extent of reaction was followed by the decline in the $\nu$(NCO) absorption at 2260 cm$^{-1}$. The reactions followed standard second order kinetics from which a rate constant could be derived. The relative rate constants of reaction were 1:2:42 for the 2-(4-methyl)pentyl cap, isopropyl cap and Jeffamine D2000 showing that there is a significant decrease in reactivity with diisocyanates for secondary versus primary ATPs.

We claim:

1. A process for the production of a secondary amine terminated polyether which is substantially free from primary and tertiary amine terminated polyethers, which process comprises the step of reacting a primary amine terminated polyether having a molecular weight of from about 2,000 to 5,000 at elevated temperature with a carbonyl compound having the formula R(R$^1$)C=O wherein R and R$^1$ are independently hydrogen, hydrocarbyl or hydrocarbyl substituted by a substituent selected from the group consisting of amino and hydroxy substituents in the presence of hydrogen and in the presence of a catalyst composition comprising (i) nickel, (ii) ruthenium and (iii) at least one other transition metal selected from either the second or third row transition metals, the amount of carbonyl compound being about 20 times the stoichoimetric amount required to react completely with the ether.

2. A process as claimed in claim 1 in which the catalyst composition comprises nickel, rhenium and ruthenium.

3. A process as claimed in claim 1 in which the hydrocarbyl groups comprise $C_1$ to $C_4$ alkyl, aryl or alkaryl groups.

4. A process as claimed in claim 3 in which the $C_1$ to $C_4$ alkyl groups comprise straight chain alkyl groups.

5. A process as claimed in claim 1 in which the carbonyl compound comprises acetone.

6. A process as claimed in claim 1 in which the primary amine terminated polyether has a molecular weight of from about 148 to of from about 148 to about 5000.

7. A process as claimed in claim 1 in which the primary amine terminated polyether is produced by reacting a corresponding alcohol with ammonia at elevated temperature in the presence of a catalyst composition comprising (i) nickel, (ii) ruthenium and (iii) either palladium, rhenium or iridium on a gamma-alumina support.

8. A process for the production of a polyurea, said process comprising reacting an amine with an isocyanate, wherein the amine is a secondary amine terminated polyether produced by the process as claimed in claim 1.

9. A process for the production of an isocyanate terminated prepolymer, said process comprising reacting an amine with a molar excess of isocyanate functional groups and producing a polyurea therefrom by reaction with water, wherein the amine is a secondary amine terminated polyether produced by the process as claimed in claim 1.

* * * * *